J. W. BRANCH.
Process or Mode of Fitting Diamonds in Metallic Holders.

No. 167,216.  Patented Aug. 31, 1875.

ATTEST:
Robert Burns.
Henry Farmer.

INVENTOR:
Joseph W. Branch
By Knight Bro.
Attys.

UNITED STATES PATENT OFFICE.

JOSEPH W. BRANCH, OF ST. LOUIS, MISSOURI.

IMPROVEMENT IN PROCESSES OR MODES OF FITTING DIAMONDS IN METALLIC HOLDERS.

Specification forming part of Letters Patent No. 167,216, dated August 31, 1875; application filed July 6, 1874.

*To all whom it may concern:*

Be it known that I, JOSEPH W. BRANCH, of St. Louis, St. Louis county, Missouri, have invented a certain new and useful Process or Mode of Fastening Diamonds in Metallic Holders, of which the following is a specification:

My improvement consists in embedding or inserting diamonds in metallic holders by the agency of heat and pressure alone, doing away entirely with any preliminary cutting or engraving of the holder to prepare a seat for the diamond, and any manipulation of the holder after the diamond is inserted in order to make its fit more secure, the whole process of inserting or embedding consisting of a prior heating of the holder and an immediate pressure of the diamond into same, thus causing it to form its own seat, and the contraction of the metal about it in cooling to hold it securely.

My preferred manner of carrying my invention into practice is to place the diamond between two pieces of steel, (or two faces of the same piece, so bent as to bring said faces into opposition,) and to press them firmly together upon the diamond, so that the diamond becomes embedded into both pieces, (or faces,) so as to make a close joint between the pieces of metal, and to cover the whole surface of the diamond. In pressing the pieces of metal upon the diamond the cutting-point of the latter may be left exposed; but a better practice is to completely invest the diamond, and to expose the point by dressing the metal off.

Figure 1:
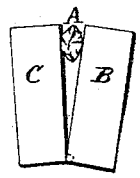
Figure 2:

In the drawings, Figure 1 is a side view of a metallic holder with the diamond arranged in position for insertion. Fig. 2 is a section through the holder after insertion of the diamond, the section being taken in a plane parallel with the side shown in Fig. 1. Figs. 3, 4, 5, and 6 are perspective views, showing various forms of holders.

A is the diamond. B and C are pieces of metal, which, together, constitute the holder into which the diamond is inserted. D is a part of a saw or other plate or bar into which the holder may be fitted; but such plate would not in all cases be requisite—as in drills, for instance, the end of the drill rod or bar might be slotted for the direct insertion of the diamond in the mode stated.

In inserting the diamonds I prefer that the parts B C of the holder shall be heated to a dull cherry red, and that the two parts shall have about equal temperature, so that the diamond shall embed itself equally in each; but this is not a matter of necessity, for if one part were quite cold and the other hot, and the metal confined laterally when under pressure, the heated metal would spread around and completely envelop the diamond except at the point in contact with the cold piece, which latter piece, in this case, might be rejected, the heated piece alone forming the holder.

The parts B C may be pressed together upon the diamond by a common vise, or by a swage specially arranged for this purpose, or by any other appliance found suitable.

In my manner of fitting diamonds exact accuracy of fit of the diamond in its cavity is insured, and the metal, in cooling, contracts upon the diamond in every direction, and with such force as to prevent the slightest looseness or shake, so that no jar or strain will loosen it in its cavity, and so tightly is it held that it cannot be removed from the holder without cutting the metal or fracture of the diamond. Neither the shape of the holder nor the manner of holding the parts B C together is material in this consideration.

I have shown in the drawings different forms of holders which I have used and found to answer a good purpose.

Figure 3:
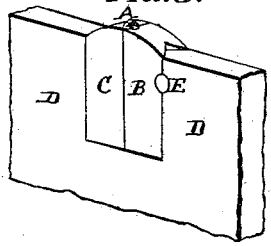

In Fig. 3 the two parts B C of the holder are disconnected except by the diamond acting as a dowel, and the edges having been tightly pressed together, forming a pressed joint, the saw-plate being chiefly relied upon to hold them in their relative position. The holder is held in the saw-plate by a transverse rivet, E, and it is held from transverse movement by the V-groove between the edges of the holder and the recess in the saw-plate.

Figure 4:
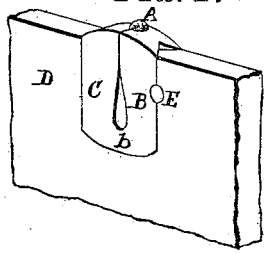

In Fig. 4 the ends or parts B C are connected by a neck, *b*, and the holder is inserted in the saw-plate in the same manner shown in Fig. 3, except that the inner corners of the recess in said plate are rounded, as shown.

Figure 5:
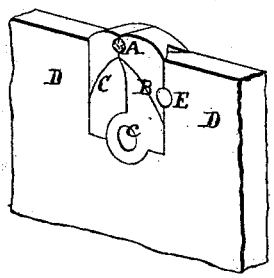

In Fig. 5 the parts B C are secured together by a hinge, c, and the holder is held in the plate in substantially the same manner as in Figs. 3 and 4.

Figure 6:
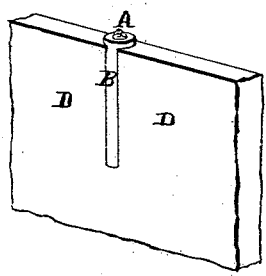

The holder shown in Fig. 6 is round, and is inserted in a seat made by drilling into the edge of the plate D.

I am aware of the mode of fastening diamonds in metallic holders patented to Terrence Smith, 27th May, 1873, No. 139,337, and, consequently, entirely disclaim such process; but

What I claim as my invention, and desire to secure by Letters Patent, is—

1. The mode of inserting or embedding diamonds in metallic holders or tools solely by the agency of heat and pressure, substantially as and for the purpose shown and specified.

2. A metallic diamond holder or tool, having the diamond inserted or embedded solely by the agency of heat and pressure, substantially as and for the purpose shown and specified.

JOSEPH W. BRANCH.

Witnesses:
SAML. KNIGHT,
ROBERT BURNS.